United States Patent

[11] 3,566,799

| | | | |
|---|---|---|---|
| [72] | Inventor | James J. Stern | |
| | | 115 Short Hills Road, West Orange, N.J. 07052 | |
| [21] | Appl. No. | 821,710 | |
| [22] | Filed | May 5, 1969 | |
| [45] | Patented | Mar. 2, 1971 | |

[54] MOTOR VEHICLE TURNTABLE ASSEMBLY
10 Claims, 4 Drawing Figs.

[52] U.S. Cl. .................................................. 104/44, 73/117
[51] Int. Cl. ........................................................ B60s 13/02
[50] Field of Search .......................................... 104/140, 141, 142, 144, 143, 145; 73/117

[56] References Cited
UNITED STATES PATENTS
1,417,384  5/1922  Imler ............................ 104/41
2,598,599  5/1952  Pleasance ..................... 73/117

Primary Examiner—Arthur L. La Point
Assistant Examiner—D. W. Keen
Attorney—Joseph S. Littenberg ABSTRACT: A motor vehicle turntable assembly for a garage or driveway or the like is provided for turning a motor vehicle around in a limited space. The turntable is mounted on support rollers which directly contact the driveway surface and are directly driven by the vehicle rear wheels via drivable wheel means mounted on the turntable and engaged by the vehicle rear wheels when the rear wheels are driven in reverse. Drivable roller means are disposed at each end of the turntable and a slide assembly is provided for covering the drivable roller means closest to the vehicle as it is driven onto the turntable and for uncovering the said closest drivable wheel means after the vehicle front wheels have moved over them.

Patented March 2, 1971 3,566,799
2 Sheets-Sheet 1
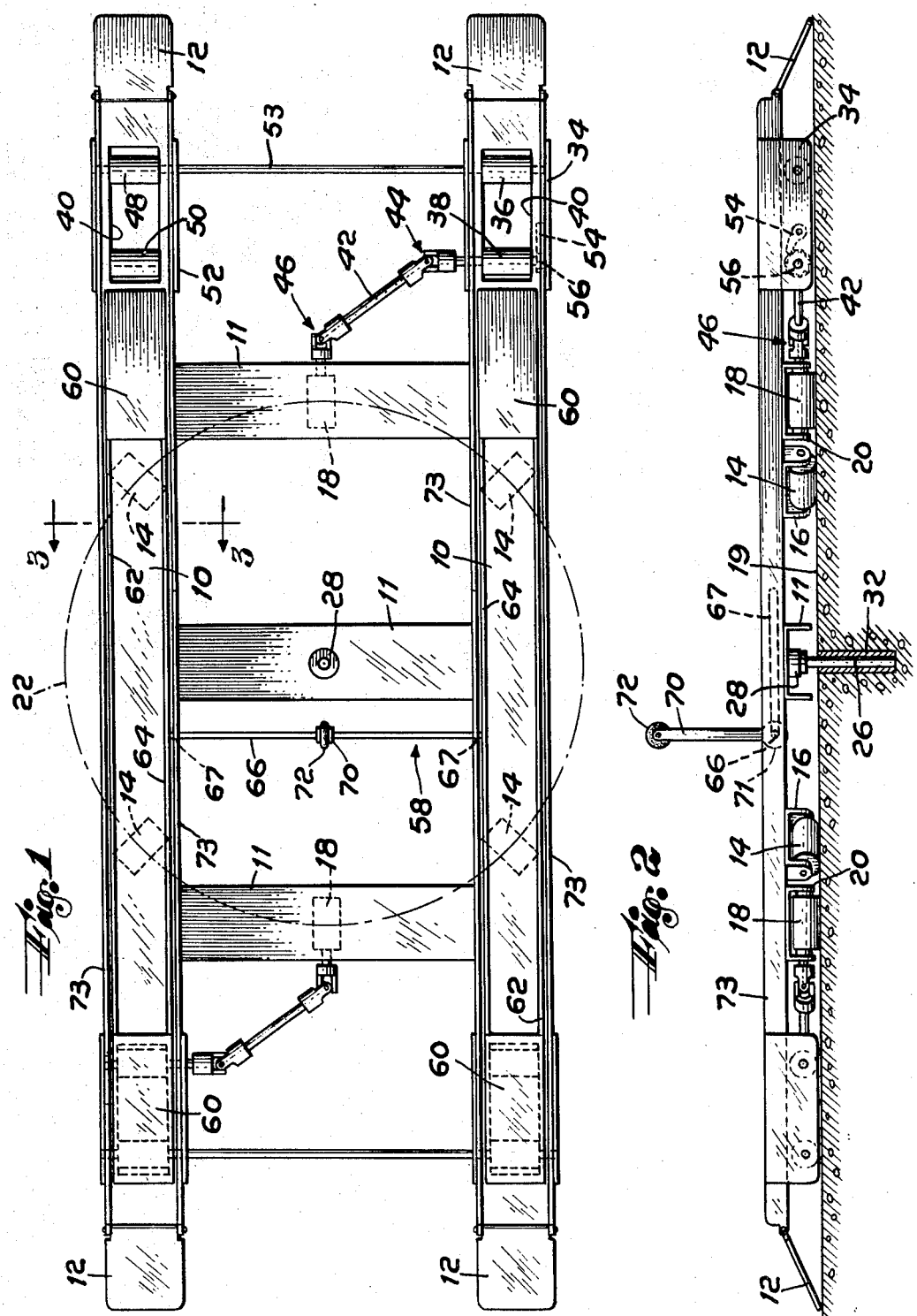
INVENTOR.
JAMES STERN
ATTORNEY Patented March 2, 1971
3,566,799
2 Sheets-Sheet 2
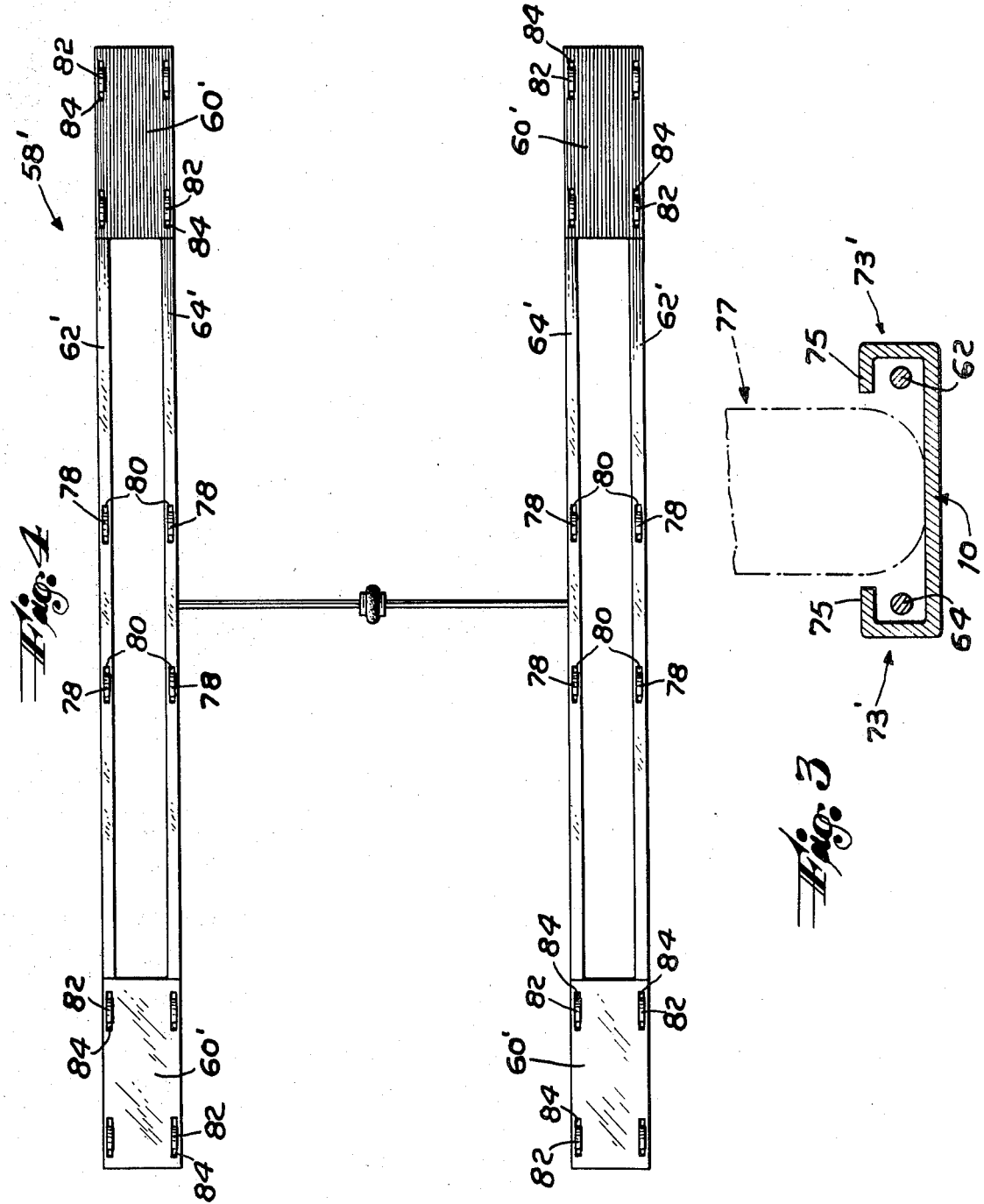
INVENTOR.
JAMES STERN
BY
ATTORNEY

MOTOR VEHICLE TURNTABLE ASSEMBLY

BACKGROUND OF THE INVENTION

Motor vehicle turntables are well known as evidenced by U.S. Pat. Nos. 1,772,075; 1,969,398; 2,566,634; 2,952,221 and 2,135,924. Reference may also be made to Reissue U.S. Pat No. 15,976.

In known constructions, a special track is provided for supporting and guiding the support rollers which rotationally mount the turntable. In the alternative, special gearing arrangements are provided for effecting the desired rotation. Either type of the foregoing arrangements requires complicated, relatively expensive manufacturing techniques and results in turntable assemblies which are relatively difficult to install. It is an object of this invention to provide a turntable assembly of a simplified construction which can be economically produced and easily installed.

The known constructions usually employ drivable roller means disposed at both ends of a turntable and each adapted to be driven by the vehicle rear wheels when engaged thereby. In operation, motor vehicles normally enter opposite ends of the turntable. This occurs since the motor vehicles enter, for example, a driveway from one end and leave the driveway from the same end. Thus, they ride up onto the turntable, the turntable is rotated 180°, and the motor vehicle is driven off the turntable. The next motor vehicle then enters the end of the turntable which accommodated the forward end of the preceding motor vehicle.

It will be observed from the foregoing that the vehicle front wheels must first pass over one of the drivable wheel means since the drivable wheel means must be provided at each end of the turntable to accommodate motor vehicles entering from either end of the turntable. Engagement of the vehicle front wheels with the drivable wheel means at the end of the turntable adjacent the entry of the motor vehicle results in an uncomfortable ride and may also result in damage to the drivable wheel means. A further object of this invention is to provide means for preventing engagement of a motor vehicle front wheels with the drivable wheel means disposed at the end of the turntable adjacent the entry of the motor vehicle.

SUMMARY OF THE INVENTION

In a motor vehicle turntable assembly including a turntable for mounting a motor vehicle and one-way drivable wheel means rotatably mounted on each end of the turntable for driving engagement with the rear wheels of the motor vehicle mounted on the turntable, each said one-way drivable wheel means being adapted to rotate when engaged by the vehicle rear wheels and the vehicle rear wheels are driven in reverse, there is provided rotatably mounted support rollers depending from the turntable and positioned to support the turntable for rotational movement about a fixed point, the bottoms of said support rollers being disposed in a common plane, and the support rollers being so positioned that the centers of the portions disposed in said common plane lie in an imaginary circle centered on said fixed point, a universal drive assembly drivenly connecting each of said one-way drivable wheel means to at least one of the said support rollers for driving the connected support rollers to rotate the turntable, and a pivot rod depending from said turntable at a position coincident with said fixed point.

In a motor vehicle turntable assembly including a turntable for mounting a motor vehicle and one-way drivable wheel means rotatably mounted on each end of the turntable for driving engagement with the rear wheels of a motor vehicle mounted on the turntable, said one-way drivable wheel means each including a pair of openings in said turntable, each opening being adapted to receive a portion of a vehicle wheel, and the openings of each pair being disposed in spaced relationship to simultaneously accommodate a pair of motor vehicle rear wheels, and said one-way drivable wheel means further comprising drivable rollers rotatably mounted adjacent each opening for supporting and engaging a vehicle wheel, there is provided a cover assembly slidably mounted on said turntable and having a pair of plate means rigidly connected together by frame means, each said plate means being of a size adapted to completely cover the pair of openings of one of said one-way drivable wheel means, said frame means maintaining said pair of plate means in a fixed spaced relationship such that when one plate means completely covers a pair of openings the other plate means is completely removed from the other pair of openings, and moving means responsive to movement of a motor vehicle onto said turntable when the pair of openings adjacent the end of the turntable receiving the motor vehicle are covered, and after the motor vehicle front wheels have moved past the said adjacent pair of openings, for sliding the cover assembly to cover the other pair of openings before the front wheels reached said other pair of openings and uncover said adjacent pair of openings before the rear wheels reach said adjacent pair of openings.

BRIEF DESCRIPTION OF THE DRAWINGS

FIG. 1 is a plan view of a turntable in accordance with the invention;

FIG. 2 is a side elevational view of the turntable of FIG. 1;

FIG. 3 is a view of a portion of the turntable taken along lines 3–3 of FIG. 1 but differs therefrom in the construction of the channel 10; and FIG. 4 is a plan view of a modified slide mechanism.

DESCRIPTION OF THE PREFERRED EMBODIMENT

Referring to FIGS. 1 and 2, the turntable assembly of the preferred embodiment of my invention comprises a turntable composed of a pair of channels 10 connected to each other in fixed parallel relationship by crossmembers 11. Runners 12 are hingedly connected to each end of each channel for supporting and guiding a motor vehicle onto and off of the turntable.

The turntable is rotatably supported on a flat surface 19 by a plurality of support rollers 14 and drive rollers 18. The surface 19 may be a concrete floor of a garage or an asphalt surface of a driveway. The surface must be one which will resist deformation under the rolling force of the support and drive rollers during turning of the turntable with a motor vehicle mounted thereon.

The support rollers 14 are rotatably mounted by brackets 16 depending from the channels 10. The drive rollers 18 are rotatably mounted by brackets 20 depending from the outer crossmembers 11.

The support rollers 14 and drive rollers 18 are shown in phantom in FIG. 1. It will be noted that FIG. 2 that the bottoms of the support and drive rollers are in a common plane, which in the illustrated embodiment is coincident with the surface 19. The centers of the portions of the rollers in the said common plane all fall within a common imaginary circle 22 shown in FIG. 1.

A pivot rod 26 depends from the center crosspiece 11 and is connected to the center crosspiece at a position coincident with the center of imaginary circle 22. The pivot rod 26 is rotatably connected to the center crosspiece 11 by means of the bearing 28. The bearing 28 preferably includes roller bearing means (not shown).

The pivot rod 26 is received in a sleeve 32 which is perpendicularly disposed in the surface 19. A suitable lubricant, such as grease, is preferably forced into the sleeve 32 to facilitate rotating movement of the pivot rod within the sleeve.

The driving arrangements for driving the drive rollers 18 at each end of the turntable are identical. They each comprise an idler roller 36 and a drivable roller 38 rotatably mounted in spaced parallel relationship by means of a bracket 34 depending from a channel 10. The rollers 36 and 38 are disposed above the plane (surface 19) defined by the bottoms of the support rollers 14 and drive rollers 18 and can rotate freely when engaged by a vehicle rear wheel. An opening 40 is provided in the channel 10 and, as is well known in the art, provides for nesting engagement of a vehicle rear wheel with the rollers 36 and 38.

A similar arrangement is provided in the opposite channel 10 for receiving the other of the pair of vehicle rear wheels. The said similar arrangement comprises an idler roller 48, drivable roller 50, depending bracket 52 rotatably supporting idler roller 48 and drivable roller 50, and another opening 40. In the illustrated embodiment, the idler rollers 36 and 48 are coupled together by idler shaft 53. This tends to prevent one vehicle wheel from rotating faster than the other vehicle wheel even though the driving force is supplied by only one wheel.

Drivable roller 38 is adapted to drive its associated drive roller 18 by means of a universal shaft 42, a universal coupling 44 connecting drivable roller 38 to the universal shaft 42, and a universal coupling 46 connecting the universal shaft 42 to the said drive roller 18.

A pawl 54 and ratchet 56 assembly permits driving of drivable roller 38 in only one direction. The pawl and ratchet assembly is adapted to permit rotation of the drivable roller 38 only when it is driven by the vehicle rear wheels when they are rotated in reverse.

It will be noted that the construction of the turntable assembly as described to this point differs from known turntable assembly constructions in providing for drive roller 18 which directly contact the surface 19. Further, the turntable is supported for rotational movement by means of the cooperating support rollers 14 and drive rollers 18 arranged about an imaginary circle 22 for movement along the imaginary circle with the turntable pivoted about the pivot rod 26 disposed at the center of the imaginary circle 22.

Referring now to FIGS. 1, 2 and 3, a cover assembly 58 is slidably mounted on the turntable. The cover assembly 58 comprises four plates 60 each of a size adapted to fully cover an opening 40. The width of the plate 60 is less than the interior width of the channels 10 to permit for sliding movement of the plates within the channels.

A pair of plates 60 is provided for each channel 10 and each pair of interconnected by an outer rod 62 and an inner rod 64 so that they are maintained in a fixed spaced relationship. A driving rod 66 connects the respective inner rods 64 to each another. The rods 62 and 64 rest on the bottoms of channels 10. The contacting surfaces of the rods and the channels may be provided with an antifriction coating to facilitate sliding movement of the cover assembly in relation to the turntable. For example, a coating of polytetrafluoroethylene may be applied to the bottom surfaces of the rods.

The driving rod 66 passes through slots 67 provided in the inner upturned edges 73 of the channels 10. It will be noted that the slots 67 are disposed centrally of the turntable and extend along the edges 73 equal distances from a point defining a line passing through the center of the imaginary circle 22 and perpendicular to the channels 10.

A vertically extending slide lever 70 is connected to the driving rod 66 by a spring actuated centering device 71. The centering device 71 may be of any well known type which functions to spring bias the lever 70 to maintain it in an upright position and permit pivoting movement of the slide lever on opposite sides of the driving rod.

A rubber roller 72 is provided at the top of the lever 70. It is positioned to normally engage the front bumper of a motor vehicle. Upon such engagement, the centering device tends to resist pivotal movement of the lever 70 so that the lever is driven forward with the motor vehicle thereby moving the entire cover assembly 58. When the rod 66 reaches an end of the slots 67, the slide lever 70 pivots downwards and underneath the motor vehicle upon further movement of the motor vehicle.

As has been observed previously, motor vehicles usually approach the turntable from only one side. The operation of the cover assembly will now be described assuming that a motor vehicle always approaches the turntable of FIG. 1 from the right viewing FIG. 1.

When a motor vehicle approaches the turntable from the right, the slide assembly is not in the position shown in FIG. 1 but rather is in the position in which the plates 60 cover the openings 40 on the right of the turntable. The vehicle front wheels pass over the plates 60 and ride in the channels 10 between the respective rods 62 and 64 so that sliding movement of the rods is not inhibited.

Further forward movement of the motor vehicle brings the front bumper thereof into engagement with the rubber roller 72. Continued forward movement causes sliding movement of the slide assembly uncovering the openings 40 on the right and causing covering of the openings 40 on the left. When the openings on the right are fully uncovered and the openings on the left are fully covered (the slide assembly being in the position shown in FIG. 1), driving rod 66 engages the ends of the slots 67 and the slide lever 70 pivots downwards as the roller 72 moves under the motor vehicle. The motor vehicle front wheels thereafter move over the plates 60 covering the openings on the left and the motor vehicle rear wheels are received in the openings 40 on the right.

When the turntable is rotated 180°, the motor vehicle is driven off of the turntable. The degree of rotation of the turntable can be limited by stops, as is well known in the art, or can be determined by the driver who may place the car in forward as soon as the turntable approaches a position when he can drive in the direction which he desires.

The 180° rotation of the turntable moves the openings which were on the right to the left. These openings are still covered by the plates 60 so that the next motor vehicle to enter will have its front wheels pass over the plates 60 before causing sliding movement of the entire cover assembly 58 as previously described.

Referring now to FIG. 4 in which a modified cover assembly 58' is illustrated, similar parts of the cover assembly 58' and the cover assembly 58 utilize identical reference numerals except that primes have been added. The modification resides in the provision of roller means for facilitating sliding movement of the cover assembly 58'.

Cover assembly 58' has narrow support rollers 78 rotatably supported within openings 80 of the rods 62' and 64'. The openings 80 of each rod are disposed on opposite sides of a line passing through the pivot point and perpendicular to the rods. Further rollers 82 are disposed in openings 84 disposed adjacent the edges of the plates 60' for rolling movement along the sides of the openings 40. An alternative to the foregoing antifriction arrangement would be to provide rounded projections depending from the cover assembly instead of the rollers 78 and 82 and providing the contacting surfaces of such projections with a suitable antifriction coating.

It will be noted that the channel 10 of FIG. 3 represents a view of the channel 10 of FIGS. 1 and 2 taken along the line 3–3 of FIG. 1 but differs therefrom in the construction of the upturned edges 73'. The edges 73' have upper inturned marginal portions 75 which form elongated side pockets in which the rods 62 and 64 are disposed. The marginal portions 75 prevent a vehicle wheel 77 shown in phantom from engaging the rods 62 and 64.

While the principals of the invention have been described in connection with a preferred embodiment thereof, it is to be understood that this description is made only by way of example and not as a limitation to the scope of the invention as set forth in the accompanying claims.

I claim:

1. In a motor vehicle turntable assembly including a turntable for mounting a motor vehicle and one-way drivable wheel means rotatably mounted on each end of the turntable for driving engagement with the rear wheels of a motor vehicle mounted on the turntable, each said one-way drivable wheel means being adapted to rotate when engaged by the vehicle rear wheels and the vehicle rear wheels are driven in reverse, the improvement comprising rotatably mounted support rollers depending from the turntable and positioned to support the turntable for rotational movement about a fixed point, the bottoms of said support rollers being disposed in a common plane, and the support rollers being so positioned that the centers of the portions disposed in said common plane define an imaginary circle centered on said fixed point with the rollers positioned for movement along the said imaginary circle, means for connecting each of said one-way drivable wheel means to at least one of the said support rollers for driving the connected support rollers to rotate the turntable, a pivot rod depending from said turntable at a position coincident with said fixed point, each of said one-way drivable wheel means includes a pair of openings in said turntable, each is adapted to receive a portion of a vehicle wheel, the openings of each pair are disposed in spaced relationship to simultaneously accommodate a pair of motor vehicle rear wheels, and said one-way drivable wheel means further comprises drivable rollers rotatably mounted adjacent each opening for supporting and engaging a vehicle wheel, the improvement further comprising a cover assembly slidably mounted on said turntable, said cover assembly comprising frame means and a pair of plate means rigidly connected together by the frame means, each said plate means being of a size adapted to completely cover the pair of openings of one of said one-way drivable wheel means, said frame means maintaining said pair of plate means in a fixed spaced relationship such that when one plate means completely covers a pair of openings the other plate means is completely removed from the other pair of openings, and moving means responsive to movement of a motor vehicle onto said turntable when the pair of openings adjacent the end of the turntable receiving the motor vehicle are covered, and after the motor vehicle front wheels have moved past the said adjacent pair of openings, for sliding the cover assembly to cover the other pair of openings before the front wheels reach said other pair of openings and uncover said adjacent pair of openings before the rear wheels reach said adjacent pair of openings.

2. In a motor vehicle turntable as claimed in claim 1, the improvement further comprising the fact that said moving means comprises a self-centering device connected to said frame means for effecting sliding movement of said cover assembly from a first position in which one of the pair of openings is fully covered to a second position in which the other of the pair of openings is fully covered and vice versa, said self-centering device including a resiliently biased pivotally mounted slide lever normally disposed in the path of travel of the front bumper of a motor vehicle driven onto the turntable, the slide lever being adapted to pivot underneath a motor vehicle when the bias is overcome and the bias being of a magnitude such that the cover assembly normally is moved by said slide lever, and limiting means on said turntable for limiting sliding movement of the slide assembly between its said first and said second positions whereby said bias is overcome upon stoppage of said cover assembly by said limiting means.

3. In a motor vehicle turntable as claimed in claim 2, the improvement further comprising the fact that the turntable comprises: a rack having two vehicle wheel supporting channels each having upturned longitudinal edges for guiding motor vehicle wheels within the channels, and a central crossmember connecting the channels in spaced parallel relationship; said limiting means comprises parallel slots formed in the inner upturned longitudinal edge portions of each channel; said cover assembly comprises: a pair of plates at each end of said turntable, one of each of said pair of plates being disposed in each of said channels, a pair of parallel connecting rods disposed in each channel on opposite longitudinal sides of each channel and connecting the plates disposed therein in said fixed spaced relationship, and an actuating rod passing through the slots of said channels and connected to the closest rod of each pair of rods; and said resiliently biased pivotally mounted slide lever is mounted on said actuating rod.

4. In a motor vehicle turntable as claimed in claim 3, the improvement further comprising the fact that said upturned longitudinal edges of said channels each comprise a marginal portion turned inwards toward the center of its respective channel disposed above the channel and forming a longitudinal pocket receiving a respective one of each of said pairs of rods thereby preventing engagement of a vehicle wheel with the rods.

5. The motor vehicle turntable assembly as defined in claim 1 of which said one-way drivable wheel connecting means is a universal drive assembly.

6. In a motor vehicle turntable assembly including a turntable for mounting a motor vehicle and one-way drivable wheel means rotatably mounted on each end of the turntable for driving engagement with the rear wheels of a motor vehicle mounted on the turntable, said one-way drivable wheel means each including a pair of openings in said turntable, each opening being adapted to receive a portion of a motor vehicle wheel, and the openings of each pair being disposed in spaced relationship to simultaneously accommodate a pair of motor vehicle rear wheels, and wherein said one-way drivable wheel means further comprises drivable rollers rotatably mounted adjacent each opening for supporting and engaging a vehicle wheel, the improvement comprising a cover assembly slidably mounted on said turntable, said cover assembly comprising frame means and a pair of plate means rigidly connected together by the frame means, each said plate means being of a size adapted to completely cover the pair of openings of one of said one-way drivable wheel means, said frame means maintaining said pair of plate means in a fixed spaced relationship such that when one plate means completely covers a pair of openings the other plate means is completely removed from the other pair of openings, and moving means responsive to movement of a motor vehicle onto said turntable when the pair of openings adjacent the end of the turntable receiving the motor vehicle are covered, and after the motor vehicle front wheels have moved past the said adjacent pair of openings, for sliding the cover assembly to cover the other pair of openings before the front wheels reach said other pair of openings and uncover said adjacent pair of openings before the rear wheels reach said adjacent pair of openings.

7. In a motor vehicle turntable as claimed in claim 6, the improvement further comprising the fact that said moving means comprises a self-centering device connected to said frame means for effecting sliding movement of said cover assembly from a first position in which one of the pair of openings is fully covered to a second position in which the other of the pair of openings is fully covered and vice versa, said self-centering device including a resiliently biased pivotally mounted slide lever normally disposed in the path of travel of the front bumper of a motor vehicle driven onto the turntable, the slide lever being adapted to pivot underneath a motor vehicle when the bias is overcome and the bias being of a magnitude such that the cover assembly normally is moved by said slide lever, and limiting means on said turntable for limiting sliding movement of the slide assembly between its said first and said second positions whereby said bias is overcome upon stoppage of said cover assembly by said limiting means.

8. In a motor vehicle turntable as claimed in claim 7, the improvement further comprising the fact that the turntable comprises a rack having two vehicle wheel-supporting channels each having upturned longitudinal edges for guiding the vehicle wheels with the channels, and a central support member connecting the channels in spaced parallel relationship, said limiting means comprises parallel slots formed in the inner edge portions of each channel, and said cover assembly comprises a pair of plates at each end of said turntable, one of each of said pair of plates being received in each of said channels, a pair of parallel connecting rods disposed on opposite longitudinal sides of each channel and connecting the plates disposed therein in said fixed spaced relationship, and an actuating rod passing through the slots of said channels and connected to and connecting to each other the innermost rods of each pair of rods, said resiliently biased pivotally mounted slide lever being mounted on and approximately centrally of said actuating rod.

9. In a motor vehicle turntable as claimed in claim 8, the improvement further comprising the fact that said slidably mounted cover assembly comprises antifriction means for facilitating sliding movement of the said cover assembly relative to the turntable.

10. In a motor vehicle turntable as claimed in claim 9, the improvement further comprising the fact that said antifriction means comprises rollers rotatably mounting said cover assembly on said turntable.